(12) United States Patent
Corradini et al.

(10) Patent No.: US 10,345,094 B2
(45) Date of Patent: Jul. 9, 2019

(54) METHOD OF MEASURING THE THICKNESS OF A FIBER TEXTURE WOUND ONTO AN IMPREGNATION MANDREL, AND A WINDER MACHINE IMPLEMENTING SUCH A METHOD

(71) Applicant: SNECMA, Paris (FR)

(72) Inventors: Sylvain Corradini, Port sur Saone (FR); Richard Mathon, Brunoy (FR); Jean-François Durand, Baraqueville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 929 days.

(21) Appl. No.: 14/786,724

(22) PCT Filed: Apr. 22, 2014

(86) PCT No.: PCT/FR2014/050966
§ 371 (c)(1),
(2) Date: Oct. 23, 2015

(87) PCT Pub. No.: WO2014/174198
PCT Pub. Date: Oct. 30, 2014

(65) Prior Publication Data
US 2016/0076874 A1    Mar. 17, 2016

(30) Foreign Application Priority Data

Apr. 26, 2013 (FR) ...................................... 13 53879

(51) Int. Cl.
*G01B 11/06* (2006.01)
*B65H 81/00* (2006.01)
(Continued)

(52) U.S. Cl.
CPC ............ *G01B 11/026* (2013.01); *B29B 11/04* (2013.01); *B29C 45/0005* (2013.01);
(Continued)

(58) Field of Classification Search
CPC ...... B65H 81/00; B65H 23/005; B65H 26/08; B29B 11/04; B29C 45/0005
(Continued)

(56) References Cited

U.S. PATENT DOCUMENTS 4,657,198 A * 4/1987 Shimizu ............... B65H 23/005
242/534.2
5,546,330 A * 8/1996 Sergel ................ B29D 30/3007
156/134

(Continued)

FOREIGN PATENT DOCUMENTS

DE     199 60 285 A1   6/2000
EP       1 961 923 A2   8/2008
WO   WO 2012/140355 A1  10/2012

OTHER PUBLICATIONS

International Search Report as issued in International Patent Application No. PCT/FR2014/050966, dated Jul. 1, 2014.

*Primary Examiner* — Michael R Mansen
*Assistant Examiner* — Mark K Buse
(74) *Attorney, Agent, or Firm* — Pillsbury Winthrop Shaw Pittman LLP

(57) ABSTRACT

A method of measuring the thickness of a fiber texture wound on an impregnation mandrel for fabricating an annular structural part of a turbine engine out of composite material, the method including, prior to winding the fiber texture, acquiring a reference distance between an outside surface of the impregnation mandrel and a distance sensor positioned facing the outside surface of the impregnation mandrel, while winding the fiber texture, acquiring at least one real distance between the distance sensor and the outside (Continued)

surface of the fiber texture wound on the impregnation mandrel, and calculating the real thickness of the fiber texture wound on the impregnation mandrel by subtracting the real distance from the reference distance.

11 Claims, 3 Drawing Sheets

(51) Int. Cl.
  *B29B 11/04* (2006.01)
  *B29C 45/00* (2006.01)
  *B29C 45/76* (2006.01)
  *G01B 11/02* (2006.01)
  *B29C 70/32* (2006.01)
  *B29C 45/14* (2006.01)
  *B29C 53/60* (2006.01)
  *B29C 53/80* (2006.01)
  *B29K 101/00* (2006.01)
  *B29K 105/10* (2006.01)
  *B29L 22/00* (2006.01)
  *B29L 31/00* (2006.01)

(52) U.S. Cl.
  CPC ........ *B29C 45/14631* (2013.01); *B29C 45/76* (2013.01); *B29C 70/32* (2013.01); *B65H 81/00* (2013.01); *G01B 11/06* (2013.01); *G01B 11/0691* (2013.01); *B29C 53/60* (2013.01); *B29C 53/8041* (2013.01); *B29K 2101/00* (2013.01); *B29K 2105/10* (2013.01); *B29L 2022/00* (2013.01); *B29L 2031/7504* (2013.01)

(58) Field of Classification Search
  USPC .................................................. 242/443, 534
  See application file for complete search history.

(56) References Cited

U.S. PATENT DOCUMENTS

| | | | | |
|---|---|---|---|---|
| 6,036,137 A | * | 3/2000 | Myren | B65H 18/10 242/534 |
| 7,055,819 B2 | * | 6/2006 | Eitel | B65H 7/08 271/227 |
| 8,892,396 B2 | * | 11/2014 | Kostka | B29D 30/3007 702/158 |
| 9,541,384 B2 | * | 1/2017 | Ham | G01B 11/306 |
| 2009/0171494 A1 | * | 7/2009 | Wachter | G05B 19/41875 700/110 |
| 2010/0198552 A1 | * | 8/2010 | Wick | B23Q 17/20 702/150 |
| 2011/0202309 A1 | * | 8/2011 | Kostka | B29D 30/3007 702/155 |
| 2014/0027046 A1 | * | 1/2014 | Mathon | B29C 70/32 156/173 |
| 2014/0262046 A1 | * | 9/2014 | Mathon | B29C 70/443 156/382 |
| 2015/0034757 A1 | * | 2/2015 | Bixler | G01B 11/0608 242/534 |
| 2015/0239181 A1 | * | 8/2015 | Corradini | B65H 23/0328 156/64 |
| 2016/0187484 A1 | * | 6/2016 | Bloomfield | G01S 17/32 250/341.8 |

* cited by examiner

METHOD OF MEASURING THE THICKNESS OF A FIBER TEXTURE WOUND ONTO AN IMPREGNATION MANDREL, AND A WINDER MACHINE IMPLEMENTING SUCH A METHOD

CROSS-REFERENCE TO RELATED APPLICATIONS

This application is the U.S. National Stage of PCT/FR2014/050966, filed Apr. 22, 2014, which in turn claims priority to French patent application number 1353879 filed Apr. 26, 2013. The content of these applications are incorporated herein by reference in their entireties.

BACKGROUND OF THE INVENTION

The present invention relates to the general field using composite material to make annular structural parts for a turbine engine, and more particularly to retention casings for gas turbine fans of aeroengines.

In a gas turbine aeroengine, a fan casing performs several functions: it defines the air inlet passage into the engine; it supports an abradable material facing the tips of the fan blades; it supports an optional structure for absorbing soundwaves in order to treat noise at the inlet to the engine; and it incorporates or supports a retention shield. Such a shield constitutes a trap for retaining debris, such as ingested objects or fragments of damaged blades that are projected outwards by centrifuging, in order to prevent them passing through the casing and reaching other parts of the aircraft.

Proposals already exist to make a fan retention casing out of composite material. By way of example, reference may be made to Document EP 1 961 923, which describes fabricating a casing out of composite material, the thickness of the casing varying and including the formation of fiber reinforcement constituted by superposed layers of a fiber texture with the fiber texture being densified by a matrix.

Document WO 2012/140355 describes an example of a winder machine suitable for use for performing such a method of fabricating a fan retention casing out of composite material. That machine comprises in particular a takeup mandrel that stores the fiber texture and a mandrel of an injection mold (referred to below as the impregnation mandrel) onto which the fiber texture stored on the takeup mandrel is to be transferred, the impregnation mandrel having an outside profile that corresponds to the inside profile of the casing that is to be fabricated.

Such a winder machine also includes a unit for controlling motors for driving the mandrels in rotation and serving to monitor the tension applied to the fiber texture while it is being wound on the impregnation mandrel. By monitoring this winding tension, and depending on the nature of the fiber texture, it is possible to determine and control the fiber content of the resulting preform.

At the end of the winding operation, compacting covers are fastened on the impregnation mandrel so as to contain the fiber preform in a cavity. The preform is then impregnated with resin under pressure so that, after the resin has been polymerized, the final shape of the fan retention casing is obtained.

When closing the injection mold by means of the covers, the fiber preform is compacted. Because of the expansion of the fibers, the preform occupies a greater volume in its free state than when it is confined inside the cavity of the injection mold.

It has been found necessary to control the expansion of the preform during winding of the fiber texture on the impregnation mandrel. If this expansion is too great, there is a risk of generating wrinkles when closing the injection mold. Conversely, if the expansion is too small, there is a risk of the fiber content in the resulting preform being too low (as a result of over-compacting).

It is also known that the expansion of the preform is associated directly with knowledge of the thickness of the fiber texture that is wound on the impregnation mandrel. Controlling expansion of the preform thus requires obtaining knowledge about the thickness of the fiber texture that is wound on the impregnation mandrel.

Unfortunately, the techniques presently known for measuring the thickness of the fiber texture on the impregnation mandrel are not satisfactory. In particular, one of the known solutions consists in measuring the preform manually by means of a caliper, e.g. once every half-turn during the winding operation. Such a solution presents numerous drawbacks. Taking such measurements is lengthy, awkward, relatively inaccurate, and depends on an operator. In addition, that measurement technique requires the winding operation to be stopped frequently, and such stops may amount to 40% of the time of the winding operation.

OBJECT AND SUMMARY OF THE INVENTION

A main object of the invention is thus to propose a method of measuring the thickness of a fiber texture being wound on an impregnation mandrel that does not present the above-mentioned drawbacks.

In accordance with the invention, this object is achieved by a method comprising prior to winding the fiber texture on the impregnation mandrel, a step of acquiring a reference distance between an outside surface of the impregnation mandrel and a distance sensor positioned facing said outside surface of the impregnation mandrel, while winding the fiber texture on the impregnation mandrel, a step of acquiring at least one real distance between the distance sensor and the outside surface of the fiber texture wound on impregnation mandrel, and a step of calculating the real thickness of the fiber texture wound on the impregnation mandrel by subtracting the real distance from the reference distance.

Such a measurement method is remarkable in that it is automatic (it does not require the intervention of an operator) and it does not require winding to be stopped in order to take measurements. In addition, the method can be used for acquiring as many real measurements of the fiber texture as are needed in order to obtain real time knowledge about the thickness of the fiber texture that is being wound on the impregnation mandrel. Thus, if a limit is crossed (whether the thickness is less than or greater than a predetermined threshold) while winding is taking place, it is possible to take action on the winding process in order to correct this value (in particular by changing the winding parameters, such as, for example: the tension applied to the fiber texture; the winding speed; or the alignment of the fiber texture).

The reference distance and the real distance may be averages calculated from measurements taken by at least three distance sensors positioned facing the outside surface of the impregnation mandrel and in alignment along an axis parallel to an axis of rotation of the impregnation mandrel. Alternatively, the reference distance and the real distance may comprise independent values obtained from measurements taken by at least three distance sensors positioned facing the outside surface of the impregnation mandrel and in alignment along an axis parallel to an axis of rotation of the impregnation mandrel. Having recourse to three distance sensors in alignment along the entire width of the impregnation mandrel makes it possible to obtain a measurement that is as accurate as possible.

Preferably, the step of acquiring at least one real distance comprises acquiring a plurality of real distances at different instants during the winding of the fiber texture on the impregnation mandrel. As a result, it is possible to obtain knowledge in real time about the thickness of the fiber texture that is being wound on the impregnation mandrel.

Also preferably, the reference distance is an average calculated for a plurality of distance values between the outside surface of the impregnation mandrel and the distance sensor as acquired over one complete revolution of the impregnation mandrel. As a result, it is possible to obtain a measurement of the reference distance that is as accurate as possible.

The real thickness of the fiber texture is advantageously compared with a predetermined theoretical thickness value. Thus, it is possible to take action on the parameters of the winding process in order to correct the value of the real thickness of the fiber texture, should it depart from the theoretical thickness value.

Also advantageously, the real thickness of the fiber texture wound on the impregnation mandrel is calculated while taking account of the impregnation mandrel bending.

The invention also provides a winder machine for winding a fiber texture on an impregnation mandrel in order to fabricate an annular turbine engine part out of composite material, the machine comprising a takeup mandrel for storing a fiber texture, the takeup mandrel having a substantially horizontal axis of rotation, an impregnation mandrel onto which superposed layers of the fiber texture stored on the takeup mandrel are to be wound, the impregnation mandrel having a substantially horizontal axis of rotation that is parallel to the axis of rotation of the takeup mandrel, electric motors for driving each of the mandrels in rotation about its respective axis of rotation, a control unit for controlling the electric motors for driving the mandrels in rotation, at least one distance sensor positioned facing an outside surface of the impregnation mandrel, and means for performing the method as defined above.

Preferably, the machine has three distance sensors positioned facing the outside surface of the impregnation mandrel and in alignment along an axis parallel to the axis of rotation of the impregnation mandrel.

The distance sensor may be fastened on a retractable arm that is mounted on a stand in order to enable the tooling to be loaded on the machine. The distance sensor may be a laser sensor.

Also preferably, the machine further includes additional distance sensors positioned facing cheekplates of the impregnation mandrel in order to measure possible bending thereof.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF THE INVENTION

The invention is described below in the context of its application to fabricating a fan casing for a gas turbine aeroengine. More generally, the invention applies to fabricating any annular structural part of a turbine engine.

An example of a method of fabricating such a fan casing is described in Document EP 1 961 923, to which reference may be made.

The casing is made of composite material comprising fiber reinforcement densified by a matrix. By way of example, the reinforcement is made of carbon, glass, aramid, or ceramic fibers, and the matrix is made of polymer, e.g. epoxy, bismaleimide, or polyimide resin.

Briefly, the fabrication method described in that document consists in making a fiber texture by three-dimensional weaving with the warp being taken up onto a drum (referred to below as the takeup mandrel) that presents a profile that is determined as a function of the profile of the casing that is to be fabricated.

The fiber texture as made in that way is then wound as a plurality of superposed layers on the mandrel of an injection mold (referred to below as the impregnation mandrel). With the preform held on the impregnation mandrel, a resin is then impregnated therein. For this purpose, compacting covers are applied to the preform and the resin is injected into the mold made in this way.

Impregnation may be assisted by establishing a pressure difference between the inside and the outside of the mold in which the preform is located. After impregnation, a step of polymerizing the resin is performed.

Figure 1:
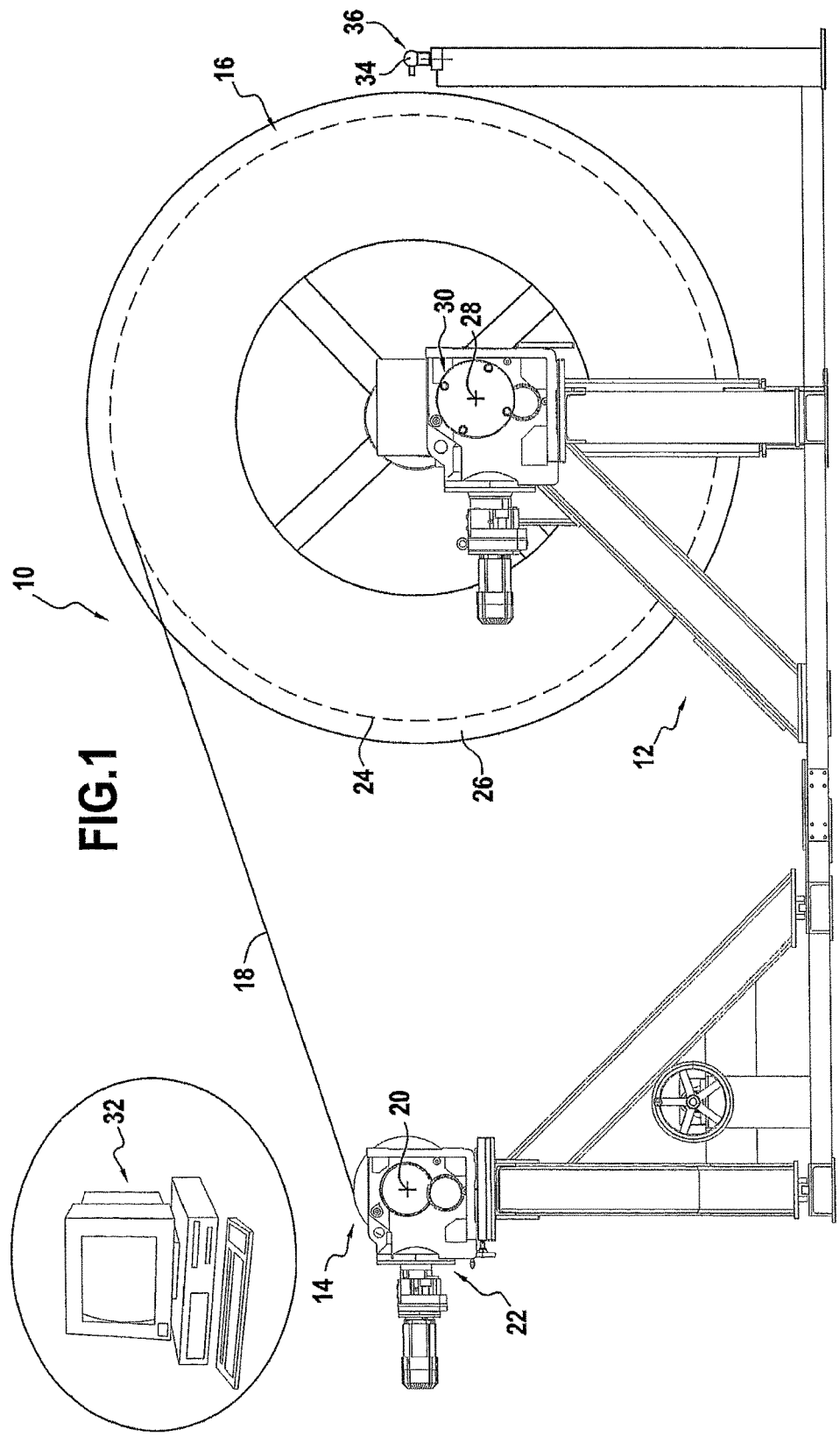
FIGS. 1 and 2 are diagrams showing a winder machine for performing the method of the invention, seen respectively in side view and in plan view.
Figure 2:
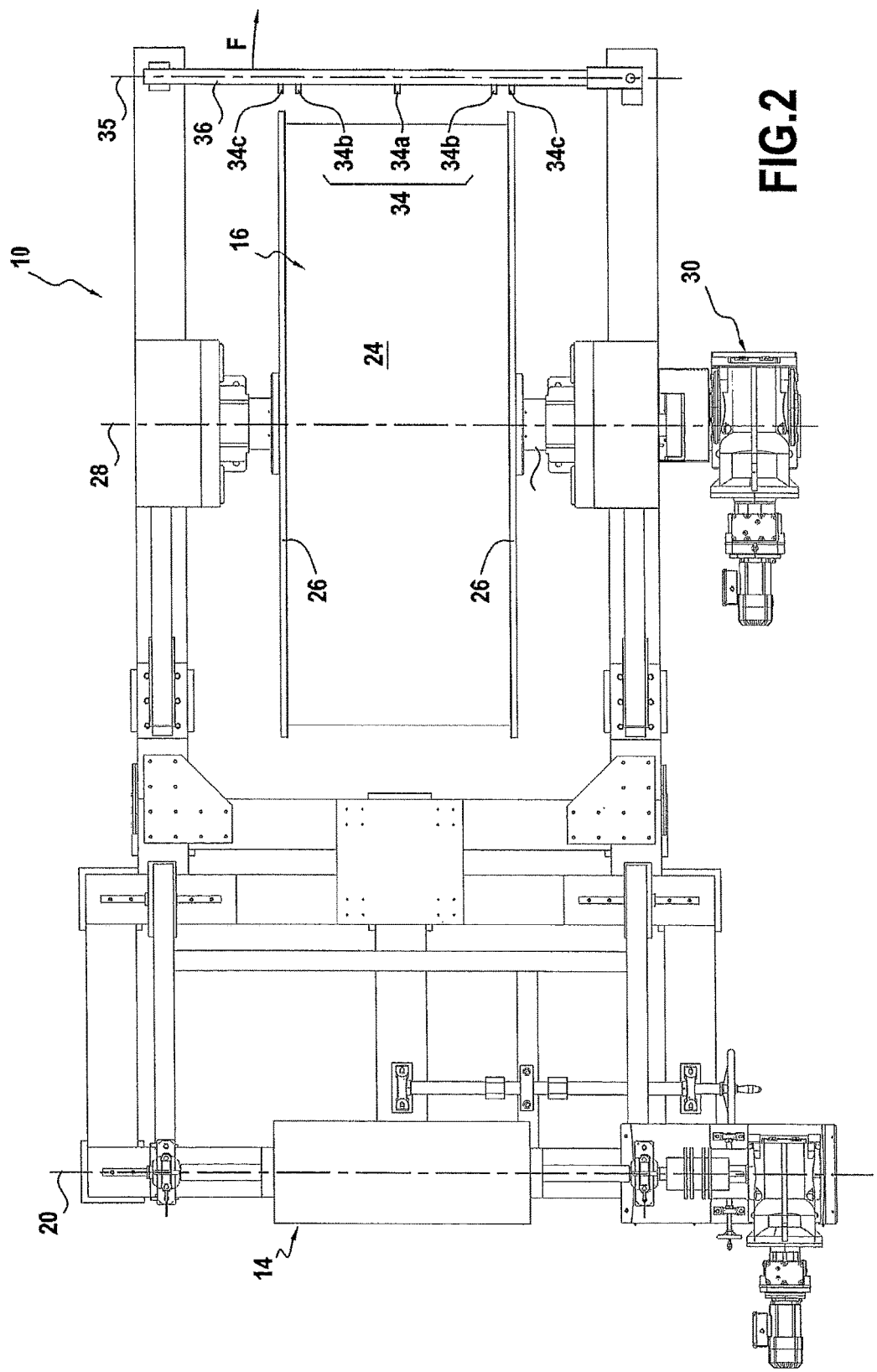

FIGS. 1 and 2 are diagrams showing a winder machine 10 suitable for use in performing such a fabrication method. Such a machine is described in detail in Document WO 2012/140355, the content of which is incorporated herein by reference.

In particular, such a winder machine serves to enable the fiber texture as stored on the takeup mandrel to be transferred automatically onto the impregnation mandrel of the resin injection mold.

The winder machine 10 comprises a stand 12 serving in particular to support a takeup mandrel 14 and an impregnation mandrel 16.

The takeup mandrel 14 that receives the fiber texture 18 is carried on a horizontal shaft 20 having one end rotatably mounted on the stand 12 of the winder machine and having its other end coupled to the output shaft of an electric motor 22, e.g. an AC electric gear motor.

The impregnation mandrel 16 is to receive superposed layers of the fiber texture stored on the takeup mandrel. It presents an outside surface 24 of profile that corresponds to the profile of the inside surface of the casing that is to be made together with two cheekplates 26.

The impregnation mandrel is carried by a horizontal shaft 28 that is parallel to the axis of rotation 20 of the takeup mandrel and that has one end rotatably mounted on the stand 12 of the winder machine and its other end coupled to the outlet shaft of an electric motor 30, e.g. an AC electric gear motor.

A control unit, e.g. a computer workstation 32, is connected to the electric motors 22 and 30 of the two mandrels, and serves in particular to control and monitor their speeds of rotation. More generally, the control unit may govern all of the operating parameters of the winder machine.

The fiber texture is wound in superposed layers on the impregnation mandrel by applying an appropriate winding tension to the fiber texture. For this purpose, a setpoint tension is predefined, in particular as a function of the nature of the fiber structure, and it is applied to the mandrel that provides the torque opposing winding (generally the takeup mandrel) by means of the computer workstation.

In accordance with the invention, the winder machine 10 also has at least one distance sensor 34 positioned facing the outside surface 24 of the impregnation mandrel 16 and connected to a data processor unit, e.g. the computer workstation 32.

Preferably, and as shown in FIG. 2, at least three distance sensors are provided in alignment one beside another along an axis 35 parallel to the axis of rotation 28 of the impregnation mandrel, namely a central sensor 34a monitoring a middle portion of the outside surface of the impregnation mandrel, and two side sensors 34b monitoring the edges of the outside surface of the impregnation mandrel.

The distance sensors 34 are positioned more precisely on a horizontal arm 36 mounted on the stand 12 of the winder machine, this arm being retractable, i.e. being capable of pivoting about one of its ends in order to be moved away from the impregnation mandrel, as represented by arrow F in FIG. 2. In the retracted position, the distance sensors no longer impede tooling being put into place around the impregnation mandrel.

The distance sensors 34 are contactless sensors suitable for measuring a distance. By way of example, they comprise laser sensors projecting a laser beam onto the outside surface of the impregnation mandrel and picking up in return the beam reflected from the same surface. They are connected to and controlled by the computer workstation.

Figure 3A:
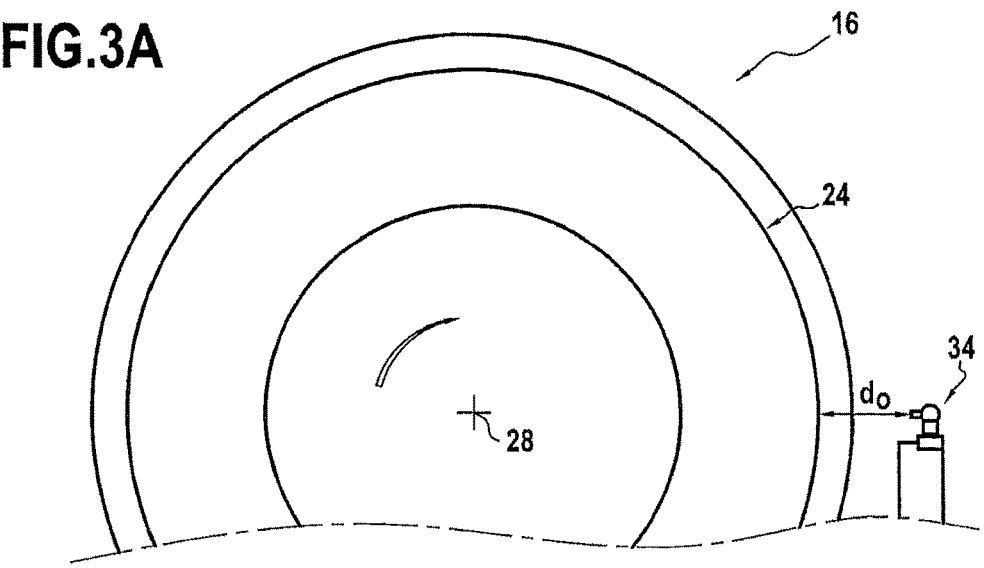
FIGS. 3A and 3B show different steps of the method of the invention as performed by the machine of FIG. 1.
Figure 3B:
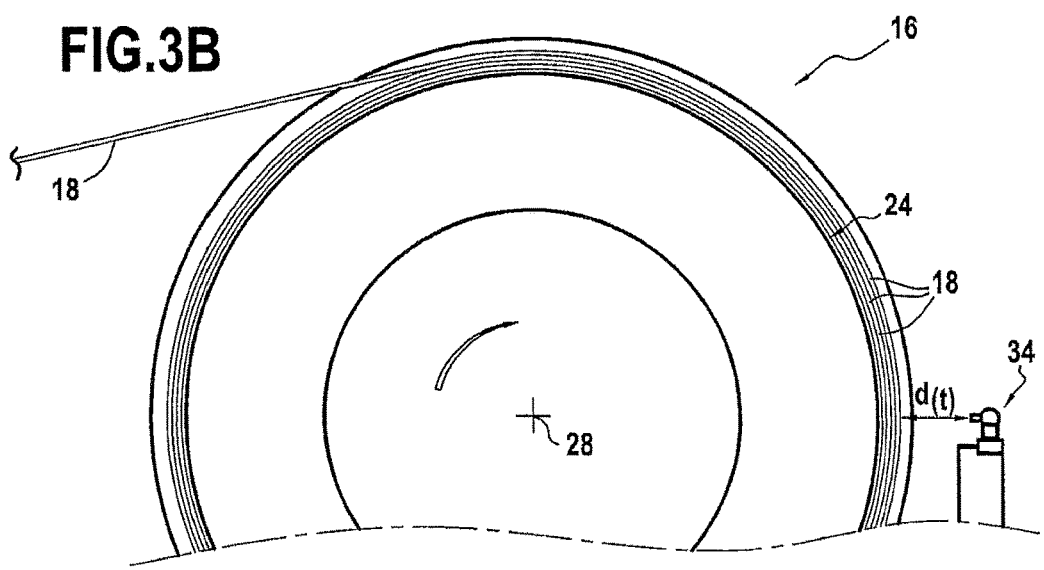

With reference to FIGS. 3a and 3b, there follows a description of the various steps of the method of measuring the thickness of the fiber texture 18 wound on the impregnation mandrel 16 of the winder machine by using the distance sensors 34.

A first step of the method consists in acquiring a reference distance $d_0$ between the outside surface 24 of the impregnation mandrel and each distance sensor 34, prior to beginning the operation of winding the fiber texture on the impregnation mandrel (the outside surface of the impregnation mandrel is then still not covered in fiber texture—FIG. 3A).

This measurement may be taken at a single angular position of the impregnation mandrel, or preferably over a complete revolution thereof so as to obtain a reference system $d_0$ that is as accurate as possible. Under such circumstances, the measurement may be performed continuously during one complete revolution of the impregnation mandrel, or else it may be performed at intervals, with a plurality of measurements being taken all around one complete revolution of the impregnation mandrel, the reference distance $d_0$ then being the mean of the values acquired during the revolution.

When use is made of a plurality of distance sensors 34a, 34b, as shown in the figures, the reference distance $d_0$ may be the average of the values acquired by all of the distance sensors. Alternatively, respective reference distances may be acquired for each of the distance sensors (thus, in this example, the reference distance has three independent distance values).

The reference distance $d_0$ is transmitted to the computer workstation 32 and is stored in a memory thereof.

Once the reference distance $d_0$ has been acquired, the operation of winding the fiber texture onto the impregnation mandrel can begin. During this operation, at an instant t of the winding operation, each distance sensor 34 takes one or more measurements of the real distance $d_{(t)}$ between the said distance sensor and the outside surface of the fiber texture 18 wound on the impregnation mandrel (FIG. 3B), or else it takes these measurements continuously.

As for the step of acquiring a reference distance, when a plurality of distance sensors 34a, 34b are used, the real distance $d_{(t)}$ as measured at the instant t may be the average of the values acquired from all of the distance sensors at that instant. Alternatively, as many real distances may be acquired as there are distance sensors (in this example, the real distance thus comprises three independent distance values).

These real distances $d_{(t)}$ are transmitted to the computer workstation 32 where the real thickness $E_{(t)}$ of the fiber texture wound at the instant t is calculated using the following function:

$$E_{(t)} = d_0 - d_{(t)}$$

When as many reference distances are acquired as there are distance sensors, the real thickness is calculated for each distance sensor using the same formula.

Preferably, real distances $d_{(t)}$ are acquired at different instants during winding of the fiber texture onto the impregnation mandrel throughout the entire winding operation (from start to finish). As a result, it is possible, throughout the winding operation, to obtain real time knowledge about the thickness $E_{(t)}$ of the fiber texture that is being wound on the impregnation mandrel.

Also preferably, the real thickness $E_{(t)}$ of the fiber texture is compared with a predetermined theoretical thickness value. Thus, in the event of too great a difference being observed between the real thickness $E_{(t)}$ as calculated at an instant t and the predetermined theoretical value for the same instant t, it is possible to take action on the operating parameters of the winder machine by using the computer workstation 32 (such as for example acting on the tension applied to the fiber texture, on the winding speed, or on the alignment of the fiber texture on the impregnation mandrel) in order to correct this value.

As a result, the measurement method of the invention makes it possible in real time to track variation in the thickness of the fiber texture that is being wound on the impregnation mandrel and to verify that it remains within an acceptable tolerance range.

Figure 4:
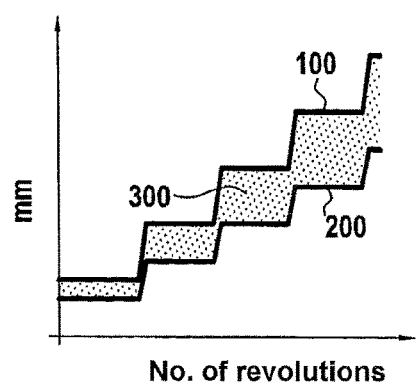
FIG. 4 is a graph showing an example of monitoring the thickness of a preform that is measured using the method of the invention.

FIG. 4 shows an example of such tracking. In this figure, curves 100 and 200 show the predetermined theoretical values for the maximum thickness (curve 100) and for the minimum thickness (curve 200) as a function of the number of revolutions of the impregnation mandrel.

The range 300 between these two curves 100 and 200 thus constitutes the acceptable tolerance for the thickness of the fiber texture that is being wound on the impregnation mandrel: if the thickness calculated at an instant t departs from this range, it is necessary to take action on the operating parameters of the winder machine in order to correct this value if possible.

It should be observed that any value situated above the range 300 corresponds to the fiber texture expanding excessively, which would lead to the preform being too thick, while any value situated beneath this range corresponds to the fiber texture being compacted excessively, which would lead to a preform that is too thin.

In an advantageous provision, account is taken of any forward or rearward bending of the impregnation mandrel 16 of the winder machine 10.

In operation, the impregnation mandrel 16 may tend to bend forwards under the effects of its own weight and of the force exerted by winding the fiber texture. Typically such bending takes place towards the takeup mandrel 14.

In order to take account of possible bending of the impregnation mandrel when calculating the thickness of the fiber texture wound on the mandrel, it is advantageous to have additional distance sensors 34c on the horizontal arm 36 that is mounted on the stand 12 of the winder machine, these additional sensors 34c being positioned laterally facing each of the cheekplates 26 of the impregnation mandrel (FIG. 2).

As a result, the additional sensors 34c continuously measure the distance between the horizontal arm 36 and the cheekplates 26 of the impregnation mandrel. In the event of the mandrel bending, this is detected by the additional sensors 34c and the measurement of this bending can be taken into account in order to correct the thickness of the fiber texture as measured by the distance sensors 34a, 34b that are positioned on the same horizontal arm.

The invention claimed is:

1. A method of measuring a thickness of a fiber texture wound on an impregnation mandrel for fabricating an annular structural part of a turbine engine out of composite material, the method comprising:
    prior to winding the fiber texture on the impregnation mandrel, acquiring a reference distance between an outside surface of the impregnation mandrel and a distance sensor positioned facing said outside surface of the impregnation mandrel;
    while winding the fiber texture on the impregnation mandrel, acquiring at least one real distance between the distance sensor and the outside surface of the fiber texture wound on impregnation mandrel; and
    calculating a real thickness of the fiber texture wound on the impregnation mandrel by subtracting the real distance from the reference distance,
    wherein the real thickness of the fiber texture wound on the impregnation mandrel is calculated while taking account of the impregnation mandrel bending.

2. A method according to claim 1, wherein the reference distance and the real distance are averages calculated from measurements taken by at least three distance sensors positioned facing the outside surface of the impregnation mandrel and in alignment along an axis parallel to an axis of rotation of the impregnation mandrel.

3. A method according to claim 1, wherein the reference distance and the real distance comprise independent values obtained from measurements taken by at least three distance sensors positioned facing the outside surface the impregnation mandrel and in alignment along an axis parallel to an axis of rotation of the impregnation mandrel.

4. A method according to claim 1, wherein the acquiring of at least one real distance comprises acquiring a plurality of real distances at different instants during the winding of the fiber texture on the impregnation mandrel.

5. A method according to claim 1, wherein the reference distance is an average calculated for a plurality of distance values between the outside surface of the impregnation mandrel and the distance sensor as acquired over one complete revolution of the impregnation mandrel.

6. A method according to claim 1, wherein the real thickness of the fiber texture is compared with a predetermined theoretical thickness value.

7. A winder machine for winding a fiber texture on an impregnation mandrel in order to fabricate an annular turbine engine part out of composite material, the machine comprising:
    a takeup mandrel for storing a fiber texture, the takeup mandrel having a substantially horizontal axis of rotation;
    an impregnation mandrel onto which superposed layers of the fiber texture stored on the takeup mandrel are to be wound, the impregnation mandrel having a substantially horizontal axis of rotation that is parallel to the axis of rotation of the takeup mandrel;
    electric motors for driving each of the mandrels in rotation about its respective axis of rotation;
    a control unit for controlling the electric motors for driving the mandrels in rotation;
    at least one distance sensor positioned facing an outside surface of the impregnation mandrel;
    a computer system for calculating a real thickness of the fiber texture wound on the impregnation mandrel by subtracting a real distance from a reference distance, wherein the reference distance is acquired, prior to winding the fiber texture on the impregnation mandrel, between the outside surface of the impregnation mandrel and the distance sensor positioned facing said outside surface of the impregnation mandrel and wherein, while winding the fiber texture on the impregnation mandrel, the real distance is acquired between the distance sensor and the outside surface of the fiber texture wound on impregnation mandrel, and
    additional distance sensors positioned facing cheekplates of the impregnation mandrel in order to measure possible bending thereof.

8. A machine according to claim 7, comprising three distance sensors positioned facing the outside surface of the impregnation mandrel and in alignment along an axis parallel to the axis of rotation of the impregnation mandrel.

9. A machine according to claim 7, wherein the distance sensor is fastened on a retractable arm that is mounted on a stand.

10. A machine according to claim 7, wherein the distance sensor is a laser sensor.

11. A method of measuring a thickness of a fiber texture wound on an impregnation mandrel for fabricating an annular structural part of a turbine engine out of composite material, the method comprising:
    prior to winding the fiber texture on the impregnation mandrel, acquiring a reference distance between an outside surface of the impregnation mandrel and a distance sensor positioned facing said outside surface of the impregnation mandrel;
    while winding the fiber texture on the impregnation mandrel, acquiring at least one real distance between the distance sensor and the outside surface of the fiber texture wound on impregnation mandrel; and
    calculating a real thickness of the fiber texture wound on the impregnation mandrel by subtracting the real distance from the reference distance,
    wherein the reference distance is an average calculated for a plurality of distance values between the outside surface of the impregnation mandrel and the distance sensor as acquired over one complete revolution of the impregnation mandrel.

* * * * *